(12) United States Patent  (10) Patent No.: US 8,366,361 B1
Landrum  (45) Date of Patent: Feb. 5, 2013

(54) FLANGE ASSEMBLY RAILROAD TRANSPORTATION SYSTEM AND METHOD

(75) Inventor: Scott C. Landrum, Southlake, TX (US)

(73) Assignee: Transportation Technology Services, Inc., Southlake, TX (US)

( * ) Notice: Subject to any disclaimer, the term of this patent is extended or adjusted under 35 U.S.C. 154(b) by 202 days.

(21) Appl. No.: 12/854,723

(22) Filed: Aug. 11, 2010

(51) Int. Cl.
 *B60P 7/08* (2006.01)
(52) U.S. Cl. ............... 410/49; 410/44; 410/47; 410/143
(58) Field of Classification Search .................... 410/44, 410/45, 46, 47, 49, 50, 32, 33, 35, 36, 42, 410/143, 150; 220/1.5; 105/355; 206/389, 206/446; 108/55.3, 57.33
See application file for complete search history.

(56) References Cited

U.S. PATENT DOCUMENTS

| | | | |
|---|---|---|---|
| 1,814,304 A * | 7/1931 | Fitch | 410/91 |
| 3,605,638 A * | 9/1971 | James | 410/49 |
| 7,591,621 B1 | 9/2009 | Landrum et al. | |
| 7,670,090 B1 | 3/2010 | Landrum et al. | |

* cited by examiner

*Primary Examiner* — Stephen Gordon
(74) *Attorney, Agent, or Firm* — Dan Brown Law Office; Daniel R. Brown

(57) ABSTRACT

A system for transporting a load of plural flange assemblies using a railcar that has open top over a load-area. The system includes a structural frame configured for positioning at least partially about the load area of the railcar. The structural frame includes a first and second incline that are opposingly oriented to define a load trough, which is accessible for insertion of at least a portion of the load thereinto from above the open top of the railcar. A railcar engagement member is disposed to fixedly couple the structural frame to the railcar. Incline dunnage is positioned on the first and second incline so as to engage and support the load, and so as to prevent direct contact between the load and the railcar. A first movable stop is coupled to the structural frame, and has an adjustment for selectively positioning it to engage and maintain the load against tipping forces.

16 Claims, 10 Drawing Sheets

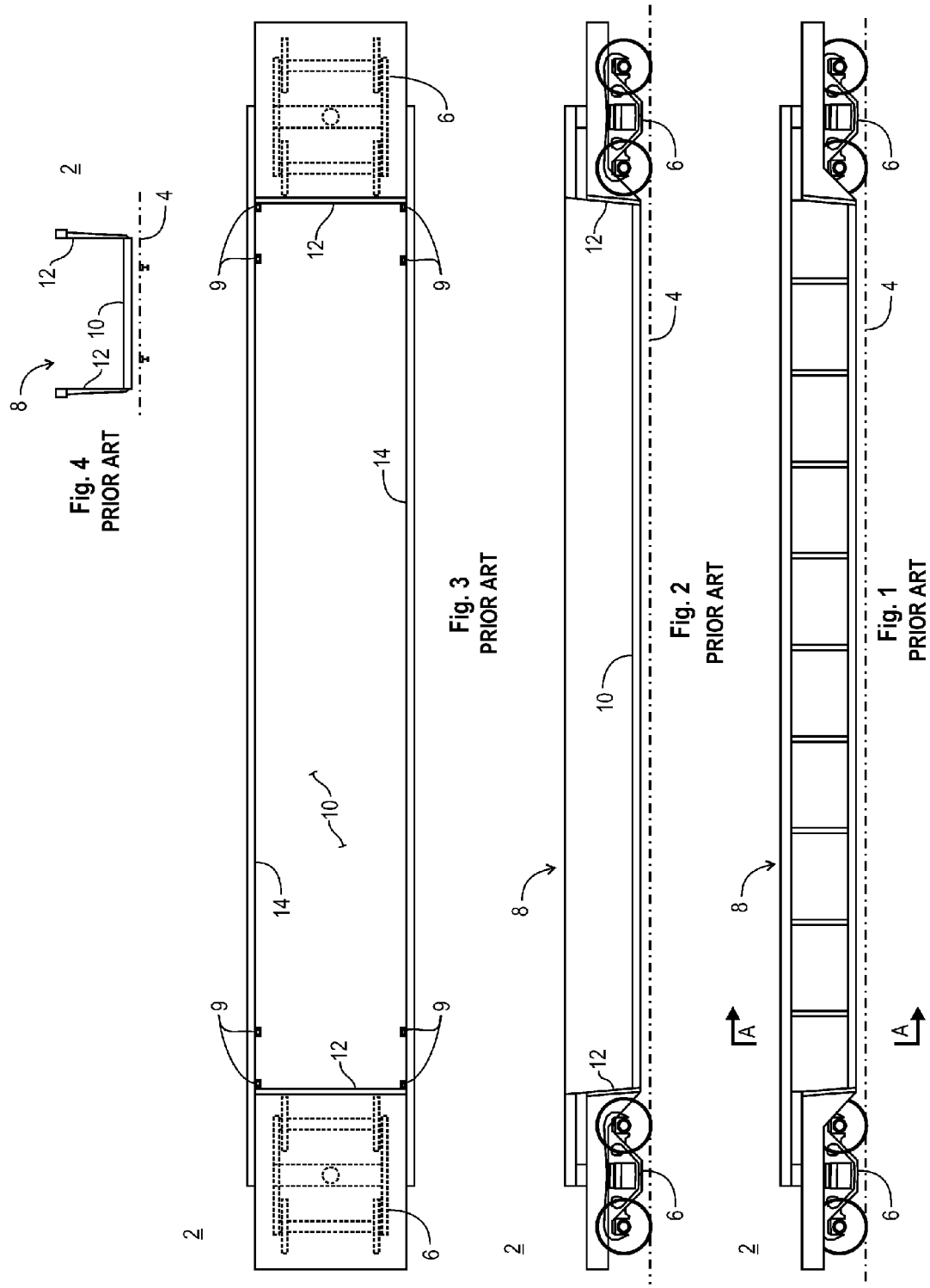

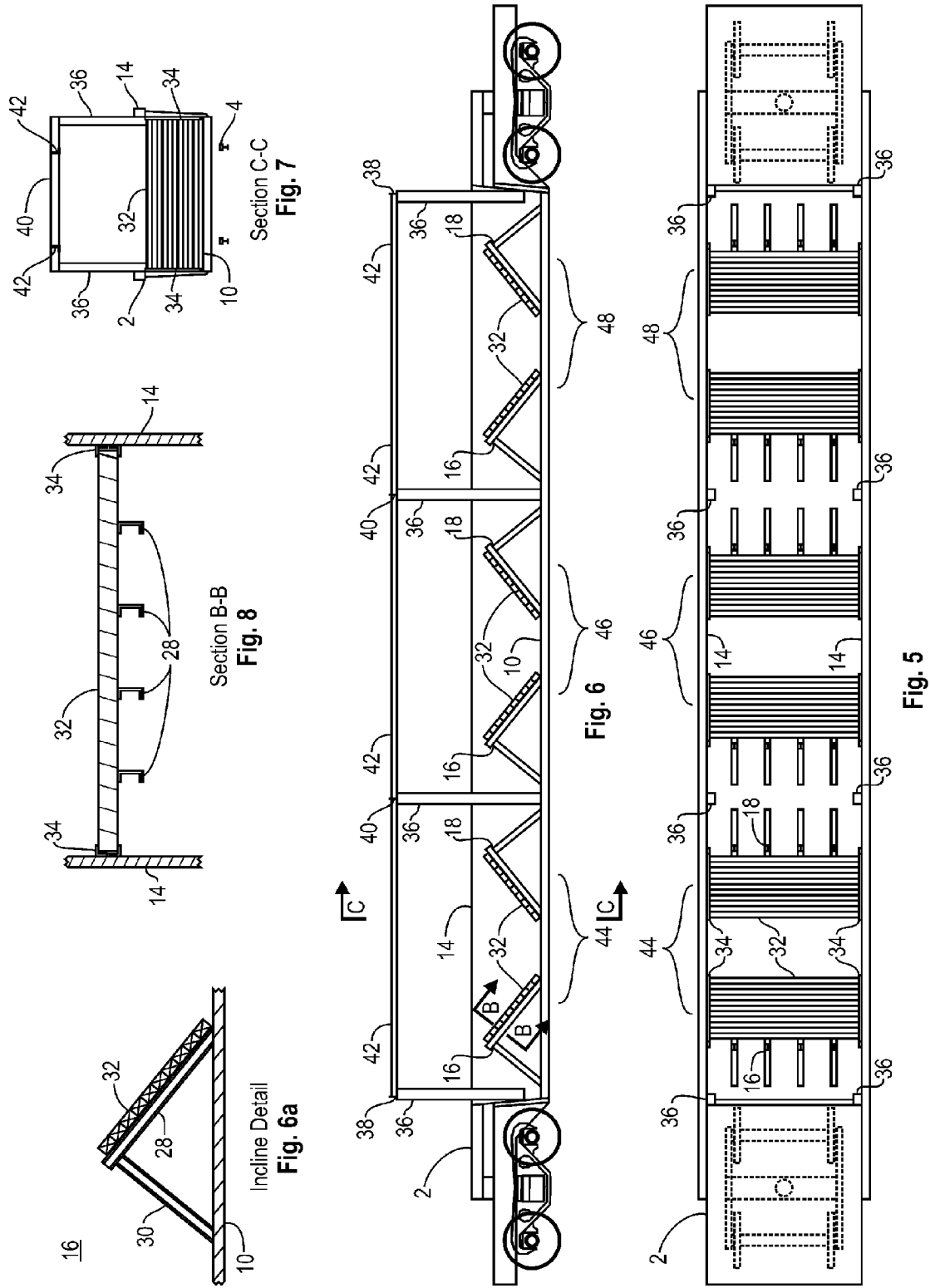

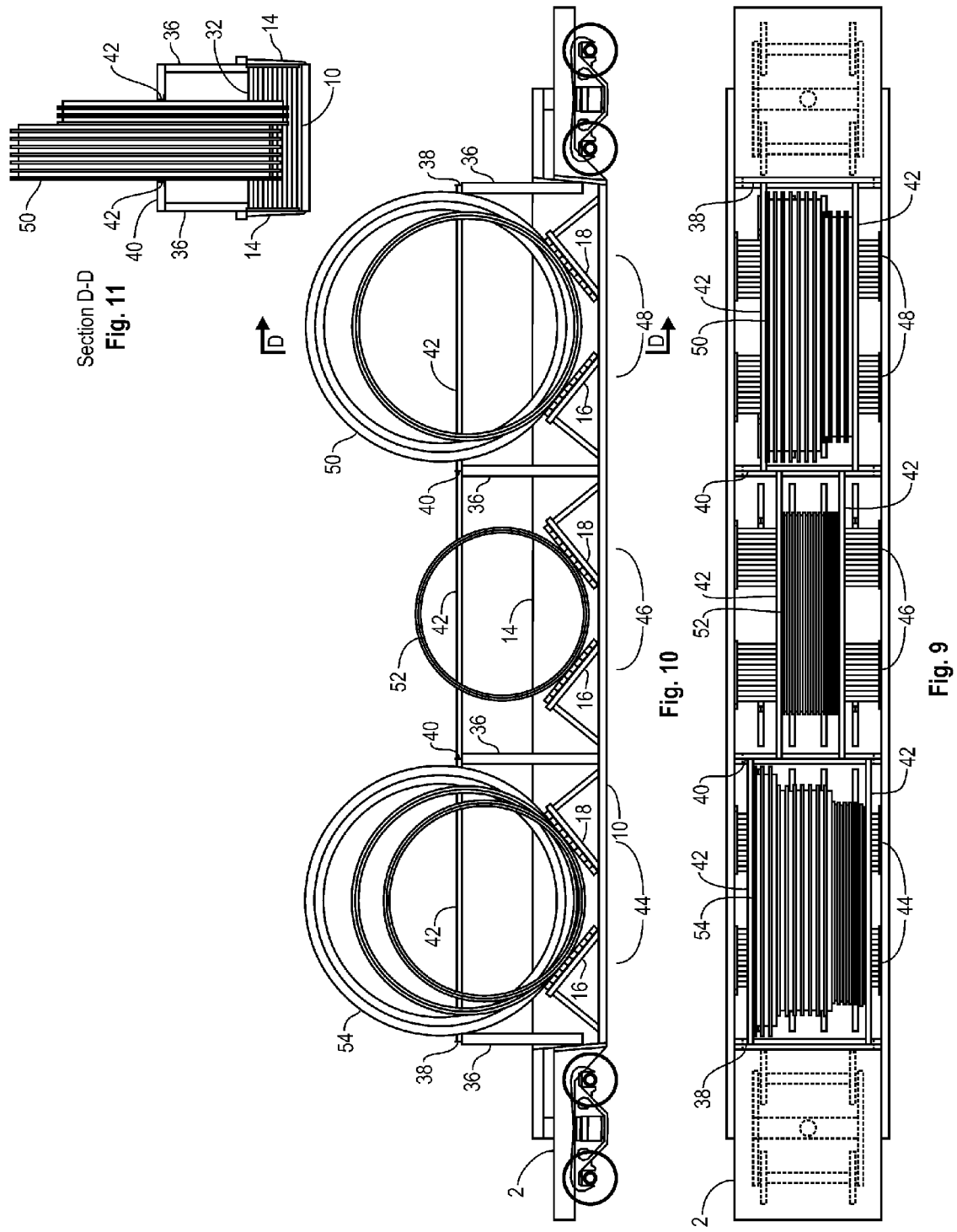

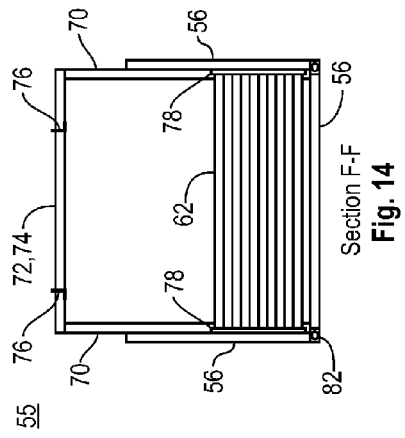
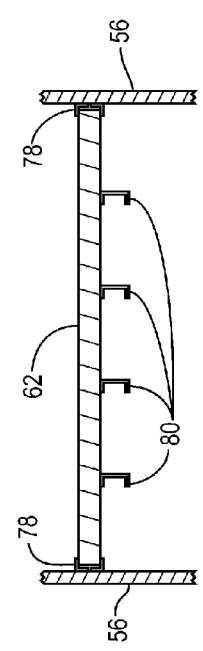
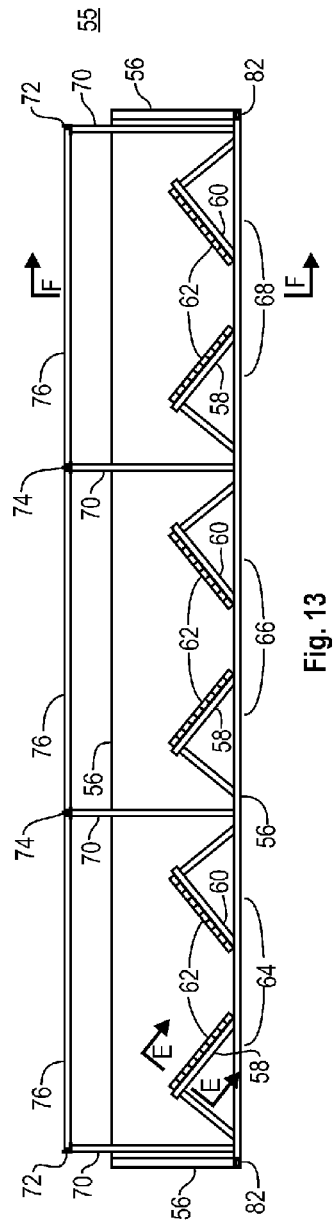
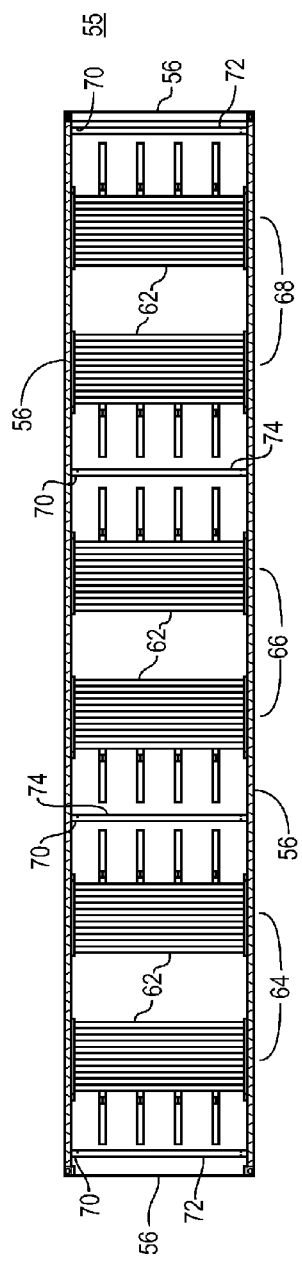

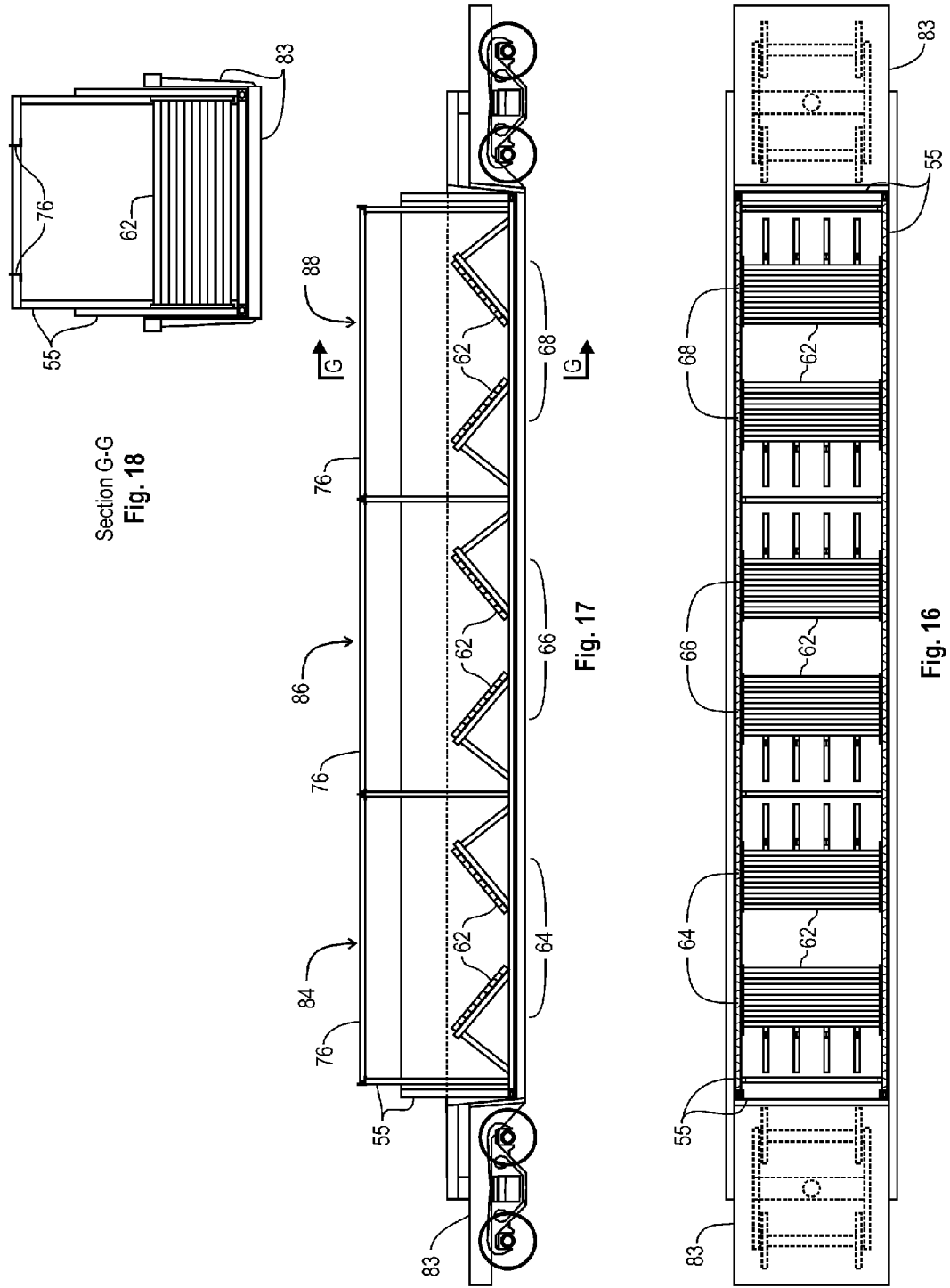

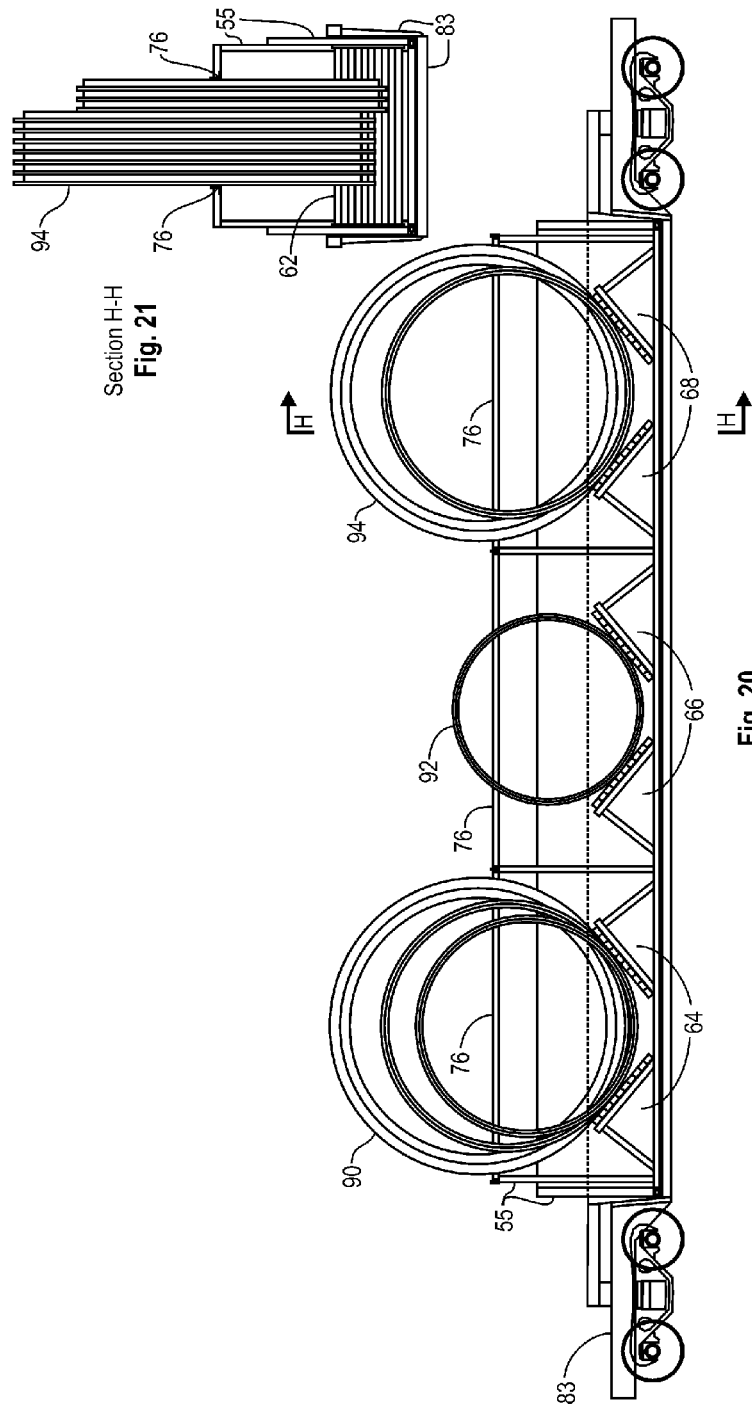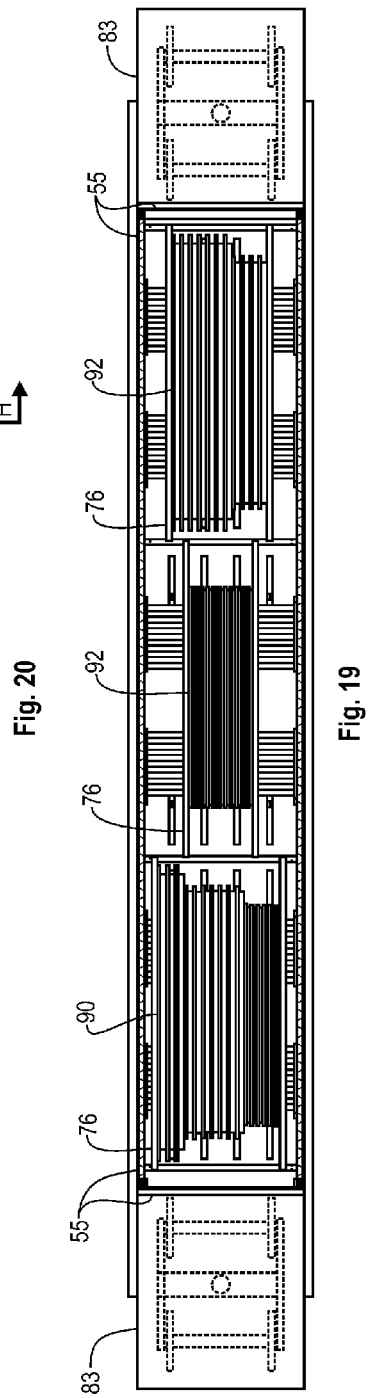

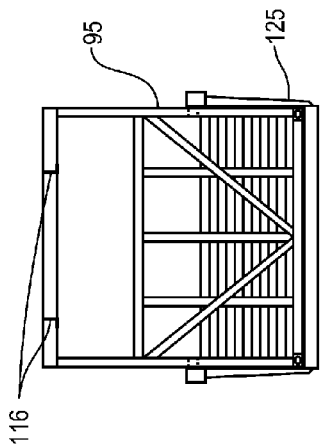
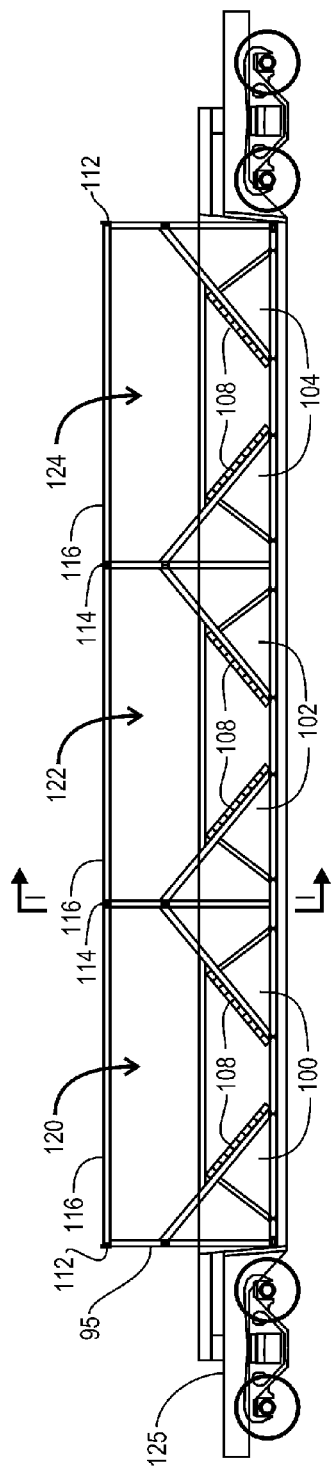
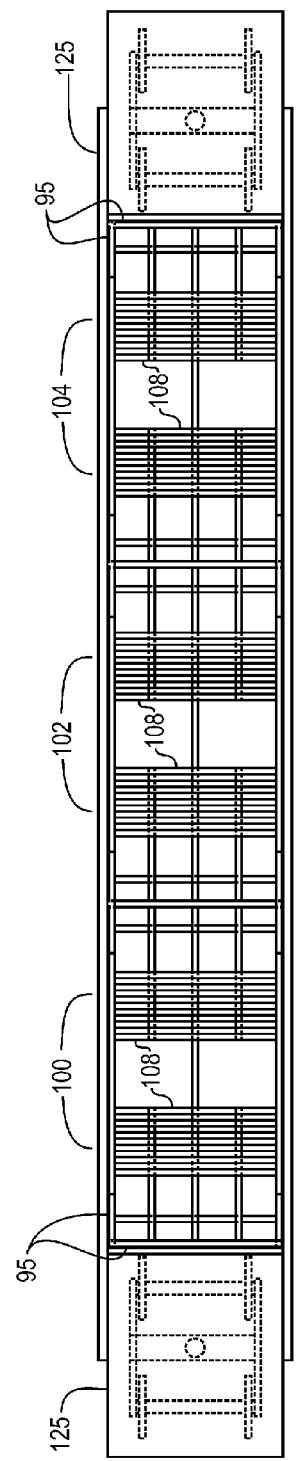

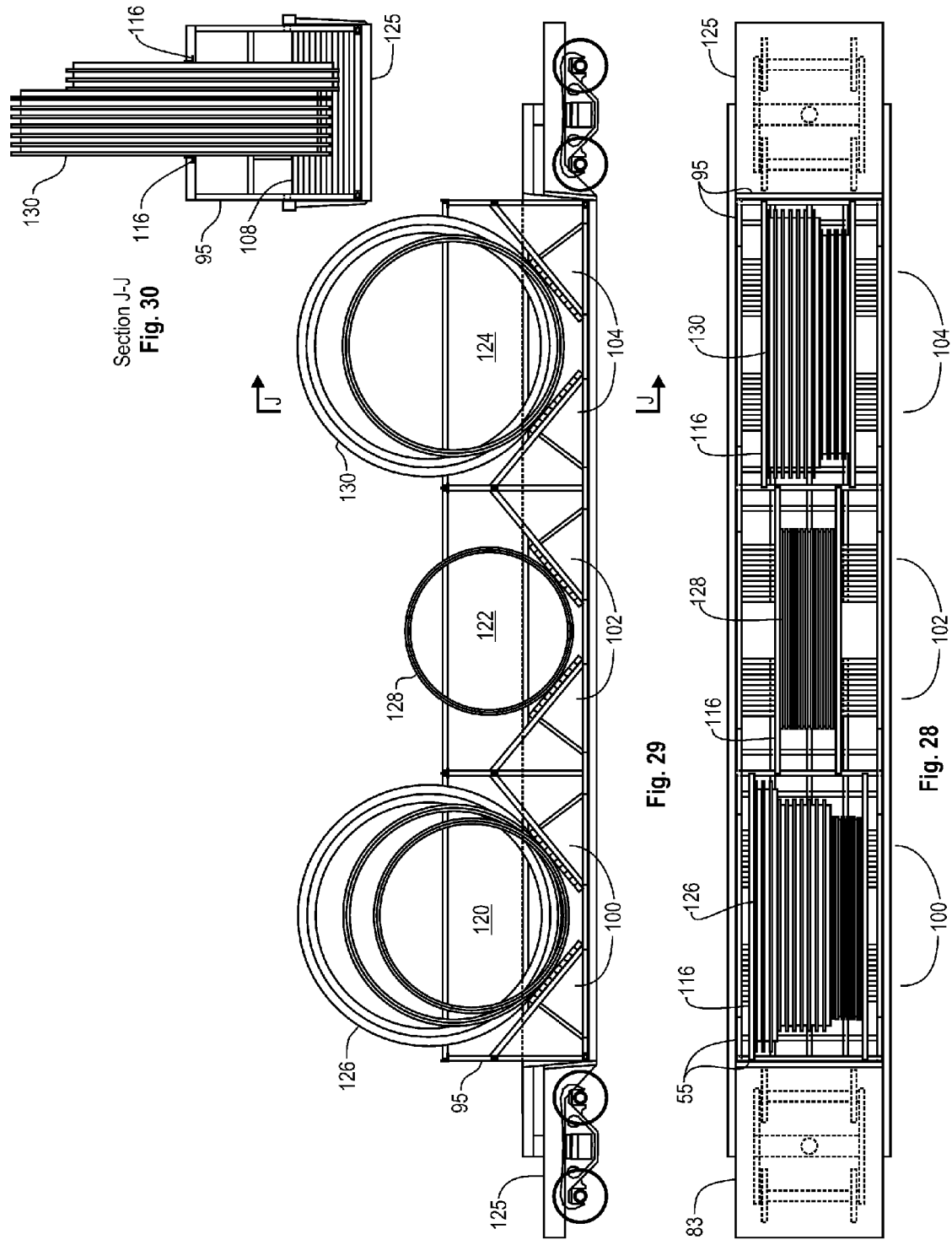

FLANGE ASSEMBLY RAILROAD TRANSPORTATION SYSTEM AND METHOD

BACKGROUND OF THE INVENTION

1. Field of the Invention

The present invention relates to transporting components for large towers. More specifically, the present invention relates to a system and method for railroad transportation of large flanges and flange assemblies used in the construction and erecting of large towers, such as towers used to support commercial wind turbines.

2. Description of the Related Art

Large-scale wind turbines are used to generate electrical power. Such wind turbines consist of a tall tower with a generator nacelle rotatably coupled about the top of tower's vertical axis. A rotor hub extends out a horizontal axis of the nacelle. Two or more turbine blades are connected to the rotor hub at right angles to the horizontal axis. During operation, prevailing winds cause the turbine blades to rotate about the rotor hub's horizontal axis. The rotational forces are coupled to a generator within the nacelle, which produces electricity. The nacelle rotates about the vertical axis of the tower to maintain the wind turbine blades in proper orientation to the direction of the prevailing winds.

The various components of a large-scale wind turbine may be manufactured at different geographic locations, which may be anywhere in the world. These components are then transported to the ultimate power generation site, assembled, erected, and placed into operation. Since the manufacturing operations may be spread across the world, transportation of the components to the generation site may utilize all modes of transportation, including ships, barges, trains and trucks. The assignee and inventors of the present invention have filed several patent applications and have been issued patents directed to various systems and methods for transporting these components. This invention address issues related to flanges and flanges assemblies for wind turbine blades, generator nacelles, tall tower sections, including transportation and erection matters.

The ever-increasing scale of wind generation systems has now evolved to the point where certain component parts have grown in size beyond allowable freight cargo dimensions and profiles. In particular, flanges and flange assemblies are presently exceeding fifteen feet in diameter, and are expected to become larger in future systems. Suppliers and manufacturers regularly ship flange assemblies separately from tower sections for various reasons, including economics, cost, and supplier source considerations. Thus it can be appreciated that there is a need in the art for a system and method for shipping large flange assemblies via railroad and other intermodal carries in a compact, reliable, safe, and cost effective manner.

SUMMARY OF THE INVENTION

The need in the art is addressed by the systems and methods of the present invention. The present invention teaches a system for transporting a cargo load that consists of plural flange assemblies, or similarly shaped objects, using a railcar that has an open top over a load area. The system includes a structural frame that is configured to be positioned at least partially about the load area of the railcar. The structural frame includes a first incline and a second incline that are opposingly oriented to define a first load trough, which is accessible for insertion of at least a portion of the load thereinto from above the open top of the railcar. A railcar engagement means is disposed to fixedly couple the structural frame to the railcar. Incline dunnage is positioned on the first and second incline so as to engage and support the load, and so as to prevent direct contact between the load and the railcar. A first movable stop is coupled to the structural frame, and has a means for selectively positioning it to engage and maintain the load against tipping forces.

In specific embodiment or the foregoing system, the load further consists of oversized flange assemblies having at least one dimension that, in combination with the railcar, exceeds a railroad clearance profile template. In another specific embodiment, the system further includes a means for binding applied about a portion of the plural flanges, thereby forming a single load unit therefrom.

In a specific embodiment of the foregoing system, the rail car is selected from an intermodal well car, a flatcar, and a gondola car. In another specific embodiment, the railcar is an intermodal well car, and the railcar engagement means include conventional intermodal container fasteners. In another specific embodiment, the structural frame consists of plural independent frame elements that are independently fixed to the railcar.

In a specific embodiment of the foregoing system, the structural frame includes an open top intermodal shipping container that has the first incline and the second incline therein, and, the open top intermodal shipping container is fixed to the railcar by the railcar engagement means. In a refinement to this embodiment, the railcar engagement means includes conventional intermodal container fixtures.

In a specific embodiment of the foregoing system, the structural frame is an open top space frame fabricated from plural structural members and configured for positioning within, and to substantially fit, the rail car load area. In another specific embodiment, the first incline and the second incline are fabricated from structural members opposingly oriented to define a parallel 'V'-shaped linear load trough. In another specific embodiment, the system also includes a structural plate fixed to the first incline and the second incline for supporting the weight of the load.

In a specific embodiment, the foregoing system further includes plural load trough portions of the structural frame, which comprise plural inclines, for accommodating additional loads of plural flange assemblies. In another specific embodiment, the railcar engagement means is selected from amongst; welding, mechanical fasteners, clamps, brackets, and conventional intermodal fasteners including twist lock fasteners. In another specific embodiment, the incline dunnage is selected from amongst; wood, paperboard, and synthetic material.

In a specific embodiment of the foregoing system, the first movable stop is a structural member selectively positionable at orientations that are substantially perpendicular to the valley of the load trough. In another specific embodiment, the foregoing system further includes plural movable stops, including the first movable stop, for selectively positioning about opposing sides of the load, thereby maintaining the load against tipping forces. In another specific embodiment, the means for selectively positioning the movable stop is selected from amongst; plural holes and pins, plural holes and fasteners, plural detents and clamps, and welding.

The present invention teaches a method of transporting a load, consisting of plural flange assemblies, on a railcar that has an open top over a load area, by utilizing a structural frame with at least a first incline and a second incline that are opposingly oriented to define a first load trough, and also incline dunnage and a first movable stop. The method includes the steps of positioning the structural frame at least partially about the load-area of the railcar and fixedly engaging the structural frame to the railcar. Also, positioning the incline dunnage on the first incline and the second incline and inserting at least a portion of the load into the first load trough from above the open top of the railcar. Also, engaging and supporting the load upon the incline dunnage, thereby preventing direct contact between the load and the railcar, and selecting a position for the first movable stop for maintaining the load against tipping forces, and finally, coupling the first movable stop to the structural frame at that position.

In a specific embodiment, the foregoing method further includes the step of binding a portion of the plural flanges together, thereby forming a single load unit therefrom. In another specific embodiment, the railcar is an intermodal well car, and, the fixedly engaging step is accomplished using conventional intermodal container fasteners. In another specific embodiment, where the structural frame consists of plural independent frame elements, the fixedly engaging step further includes the steps of independently engaging the plural independent frame elements to the railcar.

In a specific embodiment of the foregoing method, the structural frame includes an open top intermodal shipping container having the first incline and the second incline therein, and the method includes the further step of fixing the open top intermodal shipping container to the railcar. In another specific embodiment, the structural frame is an open top space frame fabricated from plural structural members to substantially fit the load area of the railcar, and the method further includes the step of positioning the structural frame within the rail car load area. In another specific embodiment, where there are plural load trough portions of the structural frame, which include plural additional inclines, the method further includes the step of inserting additional portions of the load into the plural additional load trough portions.

In another specific embodiment of the foregoing method, the selecting a position for the first movable stop further includes the step of orienting the first movable stop substantially perpendicular to the valley of the load trough. In another specific embodiment, the foregoing method further includes the steps of coupling plural movable stops to the structural frame, and selectively positioning the plural movable stops about opposing side of the load, thereby maintaining the load against tipping forces.

BRIEF DESCRIPTION OF THE DRAWINGS

FIG. 1, FIG. 2, FIG. 3 and FIG. 4 are a side view, side section view, top view, and end section view, along line A-A, of a prior art railroad intermodal well car.

FIG. 5 is a top view drawing of a railcar configured to carry plural flange assemblies according to an illustrative embodiment of the present invention.

FIG. 6 is a side section view drawing of a railcar configured to carry plural flange assemblies according to an illustrative embodiment of the present invention.

FIG. 6a is a detailed view of an incline structure according to an illustrative embodiment of the present invention.

FIG. 7 is an end section view drawing, along line C-C, of a railcar configured to carry plural flange assemblies according to an illustrative embodiment of the present invention.

FIG. 8 is a section drawing, along line B-B, of an incline structure according to an illustrative embodiment of the present invention.

FIG. 9 is a top view drawing of the railcar loaded with plural flange assemblies according to an illustrative embodiment of the present invention.

FIG. 10 is a side view drawing of a railcar loaded with plural flange assemblies according to an illustrative embodiment of the present invention.

FIG. 11 is an end section view drawing, along line D-D, of a railcar loaded with plural flanges assemblies according to an illustrative embodiment of the present invention.

FIG. 12 is a top view drawing of a structural frame for carrying plural flanges assemblies according to an illustrative embodiment of the present invention.

FIG. 13 is a side section view drawing of a structural frame for carrying plural flanges assemblies according to an illustrative embodiment of the present invention.

FIG. 14 is an end section view drawing, along line F-F of a structural frame for carrying plural flanges assemblies according to an illustrative embodiment of the present invention.

FIG. 15 is a section view drawing, along line E-E, of an incline structure according to an illustrative embodiment of the present invention.

FIG. 16 is a top view drawing of a structural frame coupled to a railcar according to an illustrative embodiment of the present invention.

FIG. 17 is a side section view drawing of a structural frame coupled to a railcar according to an illustrative embodiment of the present invention.

FIG. 18 is an end section view drawing, taken along line G-G, of a structural frame coupled to a railcar according to an illustrative embodiment of the present invention.

FIG. 19 is a top view drawing of the railcar loaded with plural flange assemblies according to an illustrative embodiment of the present invention.

FIG. 20 is a side section view drawing of a railcar loaded with plural flange assemblies according to an illustrative embodiment of the present invention.

FIG. 21 is an end section view drawing, along line H-H, of a railcar loaded with plural flanges assemblies according to an illustrative embodiment of the present invention.

FIG. 25 is a top view drawing of a structural frame coupled to a railcar according to an illustrative embodiment of the present invention.

FIG. 26 is a side section view drawing of a structural frame coupled to a railcar according to an illustrative embodiment of the present invention.

FIG. 27 is an end section view drawing, taken along line I-I, of a structural frame coupled to a railcar according to an illustrative embodiment of the present invention.

FIG. 28 is a top view drawing of the railcar loaded with plural flange assemblies according to an illustrative embodiment of the present invention.

FIG. 29 is a side section view drawing of a railcar loaded with plural flange assemblies according to an illustrative embodiment of the present invention.

FIG. 30 is an end section view drawing, along line J-J, of a railcar loaded with plural flanges assemblies according to an illustrative embodiment of the present invention.

DESCRIPTION OF THE INVENTION

Figure 24:
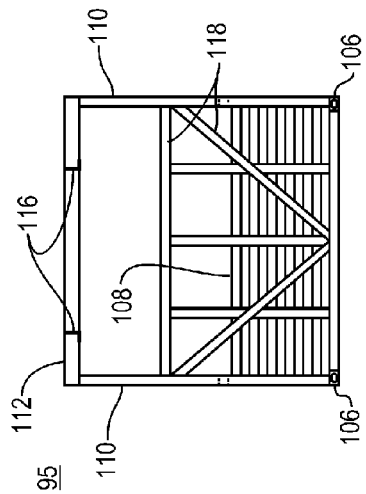
FIG. 24 is an end view drawing of a structural frame for carrying plural flanges assemblies according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present invention enables and facilitates the transportation of large flange assemblies, including oversized flange assemblies, via railroad and other modes of transport. While the present invention enables the transportation of large flanges and flange assemblies commonly used in wind turbine and wind farm systems, the teachings herein are pertinent to all manner of large flanges, as well as other ring, cylindrical, and disk-like structures and products. The present invention contemplates a structural frame that rests on, is coupled to, or is otherwise engaged with, the load area of a railcar, and which provides inclined surfaces to engage and support such structures of various sizes. Additionally, it supports and stops the load structures, or cargo, from shifting against tipping forces that occur during transportation. The present invention also addresses the logistics involved in loading, unloading, and securing the cargo in the transportation process. Open top railcars are employed, and the structural frame of the present invention illustrative embodiments readily accepts the cargo loaded from above. Moveable stops are provided that are adapted for quick and simple positioning adjacent to the cargo, holding it in a substantially vertical orientation. In certain embodiments, intermodal container standards are employed, and those skilled in the art will appreciate that such embodiments could therefore be transported with other modes, such as ships, barges, and trucks.

Various types of open top railcars can be employed with the systems and methods of the present invention. These include, among others, flatcars, gondolas, and intermodal well cars. The intermodal well car is advantageous in that the load area rides at a low height above the rails, and thus provides a larger degree of usable vertical clearance. This enables larger sized flange assemblies to be loaded within the size constraints of the railroad car and railroad load clearance profiles. Of course, oversized loads can be carried on the railroads using the present invention, but the railroad clearance issues must be otherwise addressed, as will be understood by those skilled in the art. The load area of a railcar is dependent of the type of car. In the case of a flatcar, the load simply rests on the deck of the car. In the case of an open top car with partial sides, then the load would typically fit within the sides, as well as on the deck, or bottom, of the load area. It will be appreciated that certain cars do not have a flat horizontal surface, or deck, in the load area, and, may be fabricated as an open structural space frame. In this case, the load must be adapted for support on selected points of that space frame structure.

Reference is FIG. 1, FIG. 2, FIG. 3 and FIG. 4, which are a side view, side section view, top view, and end section view, along line A-A, of a prior art railroad intermodal well car 2. The well car 2 rides on trucks 6 that ride on the rails 4. The open top load area 8 has a bottom 10, which may be a flat deck or an open space frame, a pair of side walls 14 and a pair of end walls 12. The well car 2 is designed such that the side walls 14 are rigid structural members that form the frame and spine of the car 2. In this way, the load area 8 is slung lower than in other types of railcars, such that the bottom 10 rides close to the rails 4, providing additional vertical clearance and a lowered center of gravity for both the railcar and the cargo load. The load area 8 of a well car typically includes intermodal engagement means 9, designed to an industry standard used on rail, as well as ship and truck fixtures. Intermodal engagement means are understood by those skilled in the art and include twist-lock sockets, clamps, pins, twist-lock fasteners, and other mechanical devices.

The teachings herein provide three exemplar illustrative embodiments. These distinguish one another in the nature of the railcar used and the degree to which that railcar is committed to the service of transporting flange assemblies. In every embodiment, a structural frame, having at least two inclines, is coupled to the load area of the railcar. In the case where the railcar is primarily committed to this service, then the structural frame can be welded, or otherwise permanently fixed, to the load area of the host railcar. It may also rely of the structure of the railcar for it shape and support. In the case where the host railcar is an intermodal well car, then the structural frame may be built upon and existing intermodal container, as such containers are readily available in the new and used markets. In a third illustrative embodiment, the structural frame is fabricated from various structural shapes, and is adapted to fit the load area of the host railcar, which may be an intermodal well car of other railcar type.

Suitable railcars also include 45-foot and 48-foot open top container cars. The present invention illustrative embodiments employ structural steel troughs made by arranging two incline structures in an opposing orientation. The flange assemblies can be loaded form the side of the railcar using a large forklift, or from directly overhead using a crane or similar apparatus. Several flange assemblies may be banded together, essentially forming a cylinder that is placed into the trough. Given the size of the flanges at issue, a single railcar has enough room for three troughs. The total number of flanges that can be loaded onto a single railcar depends of the size of the flanges, the length of the railcar, and the load capacity of the railcar. In one embodiment, carrying ten sets of six tower flanges, the overall height of the load is 16-feet, 9-inches, yielding a center of gravity that is 81-inches. The flange diameters range from 101 inches to 180 inches, with individual weights ranging from 1685-pounds to 4628-pounds. A typical set of flanges includes six flanges. In this disclosure, the expression "flange" and "flange assembly" are used interchangeably. The combined weight of a railcar and sixty flanges is about 100-tons. This illustrative embodiment utilizes a 70-ton Husky Stack well car, as are known to those skilled in the art.

Reference is directed to FIG. 5, FIG. 6, and FIG. 7, which are a top view, a side section view, and a cross section view, along line C-C, respectively, drawings of a railcar configured to carry plural flange assemblies according to an illustrative embodiment of the present invention. The railcar 2 is an intermodal well car that is dedicated to the service of transporting flange assemblies for some period of time. A structural frame comprising plural vertical members 36 are fixed to the load area of the well car 2 along the side walls 14. The height of the vertical members 36 is a design choice, with a height between six and eight feet being suitable for the illustrative embodiment flange sizes. Four lateral cross members 38, 40 are fixed to the tops of the vertical members 36. These lateral cross members 38, 40 support plural movable stops 42, which are selectively positionable along the length of the lateral cross members 38, 40. The end lateral cross members 38 are configured to engage and support stop members 42 at the end of the railcar. A steel angle-iron is one suitable alternative from the end lateral cross members 38. The central lateral cross members 40 engage and support plural movable stops 42 on two sides, and a structural tee is a suitable alternative for this function. Further details on this arrangement will be more fully discussed hereinafter.

The structural frame discussed regarding FIGS. 5 through 7 also includes plural inclines that are fabricated from structural steel members. The inclines are arranged in opposing pairs, 16, 18, which can be described as forward facing and rearward facing. The opposing pairs define three individual load troughs, identified as numbers 44, 46, 48 in FIG. 6. FIG. 6a is a magnified drawing of a single incline 16. The incline 16 is fixed to the floor 10 of the load area of the railcar 2. "C"-channels are used for the incline surface 28 and support legs 30. Wood dunnage 32 is used as the load carrying surface of the incline 16. FIG. 8 is a cross section of incline 16, further detailing its design. The dunnage 32 engages the side walls 14 of the railcar using pairs of angle irons 34, welded to sidewall 14 and forming a recess to retain and align the dunnage. In the illustrative embodiment, the dunnage may be 4×6 wood boards. Thus it can be appreciated that the railcar 2 forms a portion of the structural frame in that it locates the aforementioned structural components in the designed spatial relationship.

Reference is directed to FIG. 9, FIG. 10, and FIG. 11, which are a top view, a side section view, and a cross section view along line D-D, drawing of the railcar loaded with plural flange assemblies according to an illustrative embodiment of the present invention. These figures correspond to those in FIGS. 5 through 7, but with a cargo load of plural flange assemblies in place. In FIG. 9 and FIG. 10, the first load trough 44 supports a first group of flange assemblies 54, which rest by gravity in the valley of the trough. The dunnage 32 resiliently engages the edges of the flanges 54. Similarly, a second group of flanges 52 and a third group of flanges 50 rest in load troughs 46 and 48, respectively. When the flanges 54, 52, 50 are loaded into the railcar 2 at troughs 44, 46, 48, they are positioned in a substantially vertical orientation. At that time, movable stops 42 are placed into a position directly adjacent to the opposing sides of the flanges. This selective positioning action maintains the flanges in the vertical orientation, against sideways tipping forces. The natural valley of the load troughs locates the flanges in the front to back orientation. The vertical members 36 and the lateral cross members 38, 40 are selected for adequate stiffness against the expected loads during transportation. The flanges do not come into direct contact with the railcar at any time. This arrangement enables the system to transport flanges of varying diameter and varying quantity, while maintaining a simple and efficient loading operation. Minimal banding and lashing operations may be employed, but are far less complex than prior art systems for loading and restraining such loads.

Attention is directed to FIG. 12, FIG. 13, and FIG. 14, which are a top view drawing, a side section view drawing, and a cross section view drawing, taken at line F-F, respectively, of a structural frame for carrying plural flanges assemblies according to an illustrative embodiment of the present invention. This illustrative embodiment employs an open top intermodal shipping container 56 as the core of the structural frame 55. This approach is advantageous where an intermodal well car is selected as the railcar, and where the system will be coupled to the railcar using conventional intermodal connectors, fasteners, and techniques, as are understood by those skilled in the art. For example, the shipping container 56 will includes the conventional twist-lock pads 82. In this illustrative embodiment, vertical structural members 70 are fixed to the interior of the shipping container 56 at plural locations, and may be fixed by welding or other suitable means. Lateral cross members 72, 74 are fixed to the tops of the vertical members 70. Diagonal and cross bracing (not shown) may be added for structural rigidity. The lateral cross members 72, 74 support plural movable stops 76, which are selectively positionable along the length of the lateral cross members 72, 74. The vertical members 70, the lateral cross members 72, 74, and the movable stops 76 are mild steel structural sections in the illustrative embodiment, such as structural tubing, channel iron, angle iron, structural tees, and I-beams, as may be deemed suitable by an engineer. The end lateral cross members 72 are configured to engage and support movable stop members 76 at the ends of the container 56. A steel angle-iron is one suitable alternative for the end lateral cross members 72. The central lateral cross members 74 engage and support plural movable stops 76 on two sides, and a structural tee is a suitable alternative for this function. Further details on this arrangement will be more fully discussed hereinafter.

The structural frame discussed regarding FIGS. 12 through 14 also includes plural inclines that are fabricated from structural steel members. The inclines are arranged in opposing pairs, 58, 60, which can be described as forward facing and rearward facing. The opposing pairs defining three individual load troughs, identified as numbers 64, 66, 68 in FIG. 12 and FIG. 13. The inclines 58, 60 are fixed to the floor of the container 56. "C"-channels are used for the incline surface and support legs. Wood dunnage 62 is used as the load carrying surface of the inclines 58, 60. FIG. 15 is a cross section of incline 58 taken at line E-E, further detailing its design. The dunnage 62 engages the side walls 56 of the intermodal container using pairs of angle irons 78, welded to sidewall 56 and forming a recess to retain and align the dunnage 62. In the illustrative embodiment, the dunnage may be 4×6 wood boards.

Reference is directed to FIG. 16, FIG. 17, and FIG. 18, which are a top view drawing, a side view drawing, and a section view drawing, taken along line G-G, respectively, of a structural frame 55 coupled to a railcar 83 according to an illustrative embodiment of the present invention. These figures illustrate the structural frame 55 described with respect to FIGS. 12 through 14, when coupled to intermodal well car 83. FIGS. 16 and 18 illustrate the simplicity of the illustrative embodiment in that the structural frame 55 is simple placed into the load area of the well car 83, and is coupled in place using conventional intermodal container techniques, know to those skilled in the art. The open top of the structural frame 55 presents three loading bays 84, 84, and 88 directly above the three load roughs 64, 66, and 68, respectively. The troughs are protected by wood dunnage 62.

Reference is directed to FIG. 19, FIG. 20, and FIG. 21, which are a top view drawing, a side section view drawing, and a cross section view drawing, taken along line H-H, respectively, of the railcar loaded with plural flange assemblies according to an illustrative embodiment of the present invention. These figures illustrate the illustrative embodiment of FIGS. 12 though 18, but with a load of flange assemblies loaded into position. In FIGS. 19 through 21, a first load of plural flanges 90 has been loaded into the first load trough 64. A second load of plural flanges 86 has been loaded into load trough 66, and a third load of plural flange assemblies has been loaded into load trough 68. All of the flanges rest upon the dunnage 62 in the corresponding troughs. As each group of plural flanges is loaded, a pair of moveable stop members 76 are selectively positioned directly adjacent to the side of the flange assemblies. This action restrains the flange assemblies in a substantially vertical orientation, and resists tipping forces during transportation.

Figure 23:
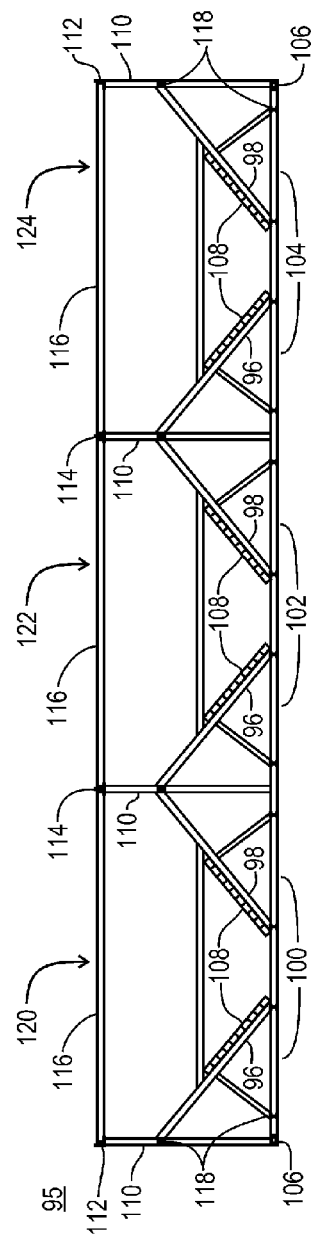
FIG. 23 is a side section view drawing of a structural frame for carrying plural flanges assemblies according to an illustrative embodiment of the present invention.
Figure 22:
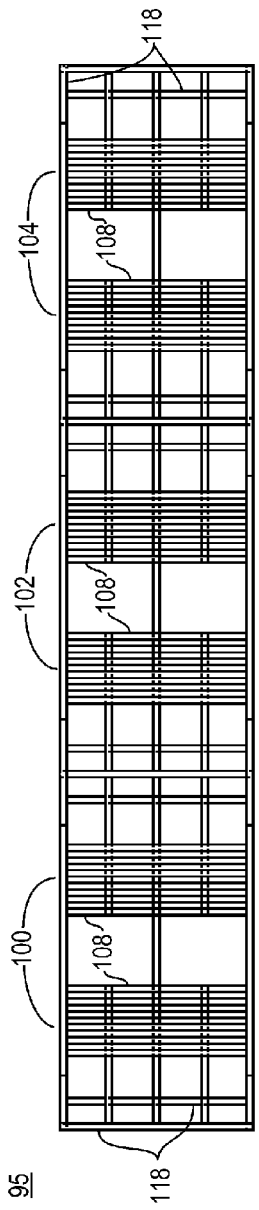
FIG. 22 is a top view drawing of a structural frame for carrying plural flanges assemblies according to an illustrative embodiment of the present invention.

Reference is directed to FIG. 22, FIG. 23, and FIG. 24, which are a top view drawing, a side section view drawing, and an end view drawing, respectively, of a structural frame 95 for carrying plural flange assemblies according to an illustrative embodiment of the present invention. This embodiment illustrates a structural frame 95 that is fabricated from various structural members, for coupling into the load area of a railcar, and for carrying the load in one of more troughs. This particular illustrative embodiment is configured generally to meet the form factor of an intermodal shipping container specification, which advantageously allows it to be coupled to the host railcar using conventional intermodal fastening schemes, as are known to those skilled in the art. However, this embodiment can be readily adapted for positioning on a flatcar or into the load area of a gondola, or any other suitable rail car or truck. The structural frame comprises a space frame fabricated from multiple structural members 118 and configured generally with a flat base having twist lock couplers at the four lower corners 106. Plural vertical members 110 extend upwardly from the base, and are located with various bracing 118, which also functions to define the plural inclines 96, 98. The specific arrangement of these structural members 118 is a design choice, with the basic requirements being the location of plural inclines 96, 98 to define the plural troughs 100, 102, and 104, and the vertical support for the lateral cross member 112, 114. The plural troughs 100, 102, 104 are functionally the same as the troughs discussed hereinbefore, including dunnage 108 disposed on the load bearing surfaces of the inclines 96, 98. Similarly, the lateral cross members 112, 114 and movable stops 116 are functionally similar to those described hereinbefore. The structural frame 95 provides three open areas from the top 120, 122, and 124 for insertion of the loads into the three troughs 100, 102, and 104.

Reference is directed to FIG. 25, FIG. 26, and FIG. 27, which are a top view drawing, a side section view drawing, and a cross section view drawing, along line I-I, respectively, of a structural frame 95 coupled to a railcar 125 according to an illustrative embodiment of the present invention. These figures illustrate the structural frame 95 described with respect to FIGS. 20 through 24, when coupled to an intermodal well car 125. FIGS. 25 through 27 illustrate the simplicity of the illustrative embodiment in that the structural frame 95 is simply placed into the load area of the well car 125, and is coupled in place using conventional intermodal container techniques, know to those skilled in the art. The open top of the structural frame 95 presents three loading bays 120, 122, and 124 directly above the three troughs 100, 102, and 104, respectively. The troughs are protected by wood dunnage 108. The movable stops 116 can be selectively positioned along the lateral cross members 112, 114.

Reference is directed to FIG. 28, FIG. 29, and FIG. 30, which are a top view drawing, a side section view drawing, and a cross section view drawing, taken along line J-J, respectively, of the railcar 125 loaded with plural flange assemblies using a structural frame 95 according to an illustrative embodiment of the present invention. These figures illustrate the illustrative embodiment of FIGS. 22 though 27, but with a cargo of flange assemblies loaded into position. In FIGS. 28 through 30, a first load of plural flanges 126 has been loaded into the first trough 100. A second load of plural flanges 128 has been loaded into trough 102, and a third load of plural flange assemblies 130 has been loaded into trough 104. All of the flanges rest upon the dunnage 108 in the corresponding troughs. As each group of plural flanges is loaded, a pair of moveable stop members 116 are selectively positioned directly adjacent to the side of the flange assemblies. This action restrains the flange assemblies in a substantially vertical orientation, and resists tipping forces during transportation is a top view drawing of the railcar loaded with plural flange assemblies according to an illustrative embodiment of the present invention.

Figure 32:
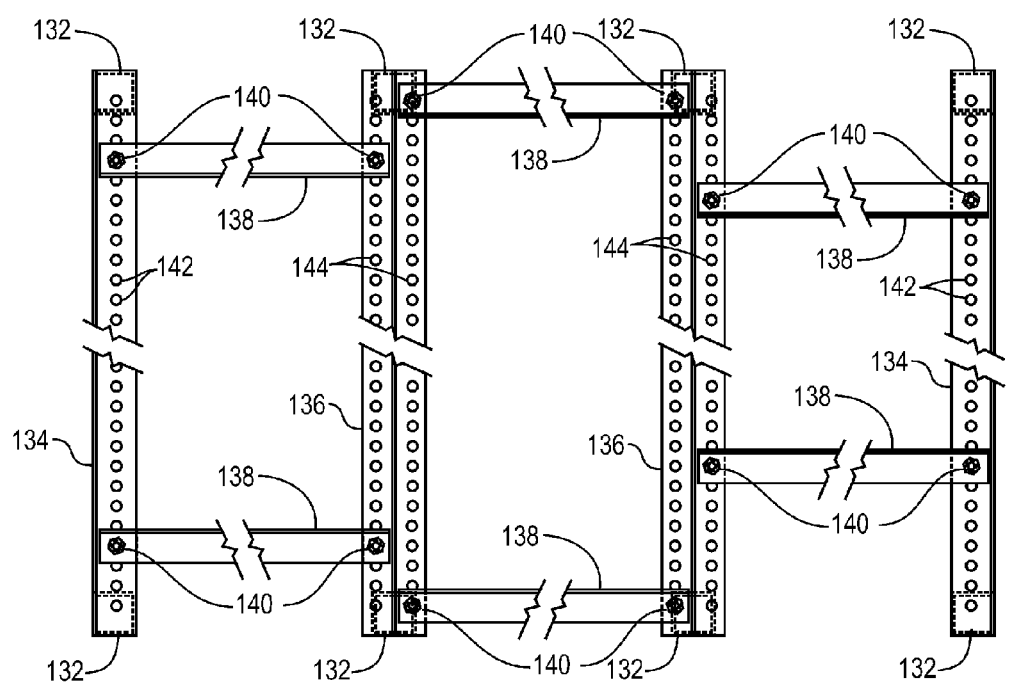
FIG. 32 is a partial top view drawing of a structural frame and movable stops according to an illustrative embodiment of the present invention.
Figure 31:
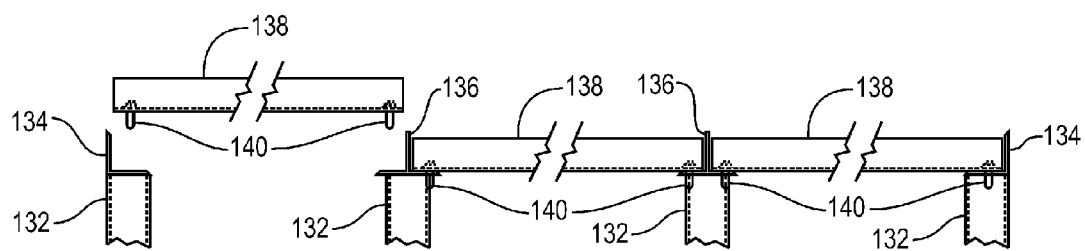
FIG. 31 is a partial side view drawing of a structural frame and movable stops according to an illustrative embodiment of the present invention.

Reference is direct to FIG. 31 and FIG. 32, which are a partial side view drawing and a partial top view drawing, respectively, of a structural frame and movable stops according to an illustrative embodiment of the present invention. As noted hereinbefore, the moveable stops are disposed along the lateral cross members, and can be selectively positioned adjacent to the cargo, so as to retain the cargo in position. It is therefore advantageous to provide a means from enabling the selective positioning in a quick and efficient manner. Given these criteria, those skilled in the art may envision various ways and means from selectively locating two structural members, such as bolts, clamps, clasps, detents, fasteners, welds, and like apparatus. In the illustrative embodiment of FIGS. 31 and 31, plural holes 142, 144 in the lateral cross members 134, 136, and pins 140 on the ends of the movable stops 138 are provided to enable those positioning the load to selectively locate the moveable stops 138. Now, more particularly, the vertical structural members 132 are four inch square tubing. The end lateral cross members 134 are four inch angle iron which is welded to the tops of the corresponding vertical members 132. The angle irons are punched with plural holes 142. The central lateral cross members 136 are structural tees with a six inch flange, and are also punched with plural holes 144 and are welded to the tops of the corresponding vertical members 132. The moveable stops 138 are three inch angle iron with pins 140 at each end. The pins engage the holes, thereby providing selective positioning. Retaining clips may be used to prevent the moveable stops from shifting the pins out of the holes.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting a load consisting of plural flange assemblies having diameters greater than one hundred inches, which are subject to shifting under sideways tipping forces during transportation, on a railcar having an open top over a load-area, the railcar having a lateral, side to side, axis and a vertical axis, comprising:
a structural frame configured to be positioned at least partially about the load area of the railcar, the structural frame including at least a first incline and a second incline opposingly oriented to define a first load trough accessible for insertion of at least a portion of the load thereinto from above the open top of the railcar, said structural frame further consisting of plural vertical members extending upwardly at least seventy-two inches from the load area to support plural lateral cross members;
railcar engagement means disposed to fixedly couple the structural frame to the railcar;
incline dunnage, positioned on the first incline and the second incline, to engage and support the load, and to prevent direct contact between the load and the railcar, and
a first movable stop coupled between two of said lateral cross members and oriented perpendicular thereto along the length of the railcar, having a means for selectively positioning to engage and maintain the load against lateral tipping forces.

2. The system of claim 1, wherein the load further consists of oversized flange assemblies having at least one dimension that, in combination with the railcar, exceeds a railroad clearance profile template.

3. The system of claim 1, further comprising:
a means for banding applied about a portion of the plural flange assemblies, thereby forming a single load unit therefrom.

4. The system of claim 1, wherein the rail car is selected from an intermodal well car, a flatcar, and a gondola car.

5. The system of claim 1 wherein the railcar is an intermodal well car, and wherein:
the railcar engagement means include conventional intermodal container fasteners.

6. The system of claim 1, and wherein:
the structural frame comprises plural independent frame elements that are independently fixed to the railcar.

7. The system of claim 1, and wherein:
the structural frame includes an open top intermodal shipping container having the first incline and the second incline therein, and wherein
the open top intermodal shipping container is fixed to the railcar by the railcar engagement means.

8. The system of claim 7, and wherein:
the railcar engagement means includes conventional intermodal container fixtures.

9. The system of claim 1, and wherein:
the structural frame is an open top space frame fabricated from plural structural members and configured for positioning within, and to substantially fit, the rail car load area.

10. The system of claim 1, and wherein:
the first incline and the second incline are fabricated from structural members opposingly oriented to define a parallel 'V'-shaped linear load trough.

11. The system of claim 1, further comprising:
structural plate fixed to the first incline and the second incline for supporting the weight of the load.

12. The system of claim 1, further comprising:
a second load trough of the structural frame, which comprises two additional inclines, for accommodating additional loads of plural flange assemblies.

13. The system of claim 1, and wherein:
the railcar engagement means is selected from welding, mechanical fasteners, clamps, brackets, and conventional intermodal fasteners including twist lock fasteners.

14. The system of claim 1, and wherein:
the incline dunnage is selected from wood, paperboard, and synthetic material.

15. The system of claim 1, further comprising:
plural movable stops, including the first movable stop, for selective positioning on opposite sides of the load, thereby maintaining the load against lateral tipping forces.

16. The system of claim 1, and wherein:
the means for selectively positioning the movable stop is selected from; plural holes and pins, plural holes and fasteners, plural detents and clamps, and welding.

* * * * *